United States Patent [19]
Wakahara

[11] Patent Number: 5,584,370
[45] Date of Patent: Dec. 17, 1996

[54] LOCK-UP TYPE AUTOMATIC TRANSMISSION SYSTEM WITH HYDRAULIC FLUID COOLING DEVICE

[75] Inventor: Tatsuo Wakahara, Kawasaki City, Japan

[73] Assignee: Nissan Motor Co., Ltd., Yokohama City, Japan

[21] Appl. No.: 397,841

[22] Filed: Mar. 2, 1995

[30] Foreign Application Priority Data

Mar. 3, 1994 [JP] Japan .................................... 6-033712

[51] Int. Cl.⁶ ......................................... F16H 45/02
[52] U.S. Cl. ........................... 192/3.3; 192/113.1
[58] Field of Search .................... 192/3.3, 3.29, 192/113.1, 113.3, 113.35

[56] References Cited

U.S. PATENT DOCUMENTS

| | | | |
|---|---|---|---|
| 4,051,932 | 10/1977 | Arai et al. | 192/3.3 |
| 4,790,216 | 12/1988 | Eggert et al. | 192/3.3 X |
| 5,058,716 | 10/1991 | Lippe et al. | 192/3.3 X |
| 5,251,734 | 10/1993 | Benford et al. | 192/3.3 |
| 5,305,862 | 4/1994 | Gierer | 192/3.3 |
| 5,339,935 | 8/1994 | Ishii et al. | 192/3.3 |

*Primary Examiner*—Rodney H. Bonck
*Attorney, Agent, or Firm*—Foley & Lardner

[57] ABSTRACT

A lock-up type automatic transmission system includes a torque converter having a lock-up control valve and a lock-up solenoid for controlling the lock-up control valve. In the lock-up state, the lock-up control valve supplies a torque converter operating pressure to an apply chamber of the torque converter and it connects a release chamber of the torque converter to a drain circuit. In the converter state, the lock-up control valve supplies the operating pressure to the release chamber and connects the apply chamber to the drain circuit. In the lock-up state, when the apply pressure to the apply chamber reaches or exceeds a predetermined level, the lock-up control valve operates as a by-pass valve and directs excess hydraulic fluid, which is directed to the apply chamber, to the drain circuit or an oil cooler interposed in the drain circuit.

6 Claims, 2 Drawing Sheets

LOCK-UP TYPE AUTOMATIC TRANSMISSION SYSTEM WITH HYDRAULIC FLUID COOLING DEVICE

BACKGROUND OF THE INVENTION

1. Field of the Present Invention

This invention relates generally to a lock-up type automatic transmission system provided with a hydraulic fluid cooling device.

2. Description of the Related Art

It is a recent trend in the automobile industry to adopt lock-up type automatic transmission systems for improving the transmission efficiency and achieving an enhanced fuel economy. The lock-up type automatic transmission system typically includes a torque converter which is interposed in a power transmission path, a lock-up clutch defining an apply chamber and a release chamber in the torque converter, and a lock-up control device for achieving a lock-up state of the torque converter in which input and output elements of the converter are directly connected with each other. The lock-up state is established when a vehicle is driven in a lock-up region in which the torque multiplying function and the torque fluctuation absorbing function of the torque converter are unnecessary.

When performing a lock-up control operation on the torque converter of such a type, similarly as in the case of an automatic transmission described in "Service Manual For Nissan RE4R01A-Type Full-Range Electronically Controlled Automatic Transmission" issued by Nissan Motor Co., Ltd., the assignee of the entire interest and title relative to the present invention, it is first judged which of a lock-up region and a converter region the state of a driven vehicle belongs to. Subsequently, if belonging to the lock-up region, the torque converter is put into a lock-up state in which the input and output elements are connected to each other. Conversely, in case of the converter state, the torque converter is put into a converter state in which the direct connection is not established between the input and output elements.

As described in the abovementioned service manual, in a conventional apparatuses for performing the lock-up, it is the general practice to establish the lock-up state of the torque converter by means of a lock-up control valve, through which a torque converter operating pressure is supplied to the apply chamber and the release chamber is brought into communication with a drain circuit.

Besides, an automatic transmission is provided with an oil cooler for cooling the hydraulic fluid thereof. A conventional hydraulic fluid cooling device of an automatic transmission system, including an oil cooler as a primary component, is disclosed in the abovementioned service manual, and has an arrangement as described below.

FIG. 1 illustrates a conventional hydraulic fluid cooling device provided in an automatic transmission system. Reference numeral 1 denotes a torque converter; 2 a lock-up control valve; and 3 an oil cooler. The torque converter 1 has an apply chamber $1_A$ and a release chamber $1_R$ which are partitioned by a lock-up clutch (not shown). When a torque converter operating pressure $P_T$ is supplied to the apply chamber $1_A$ under the control of the lock-up control valve 2 responsive to a pressure signal sent from a lock-up solenoid 4, the torque converter 1 is put into a lock-up state by the engagement of a clutch. Conversely, when the torque converter operating pressure $P_T$ is supplied to the release chamber $1_R$, the torque converter is put into a converter state by releasing the lock-up clutch. Further, a hydraulic fluid cooling device is formed by connecting the oil cooler 3 through an orifice 5 with a circuit for supplying the torque converter operating pressure to the apply chamber $1_A$.

It has been confirmed, however, that in the case of the conventional hydraulic fluid cooling device for a lock-up type automatic transmission system having the abovementioned arrangement, the following problems may arise from the fact that the hydraulic fluid of an amount corresponding to the cross-sectional area of the orifice 5 is moved to the oil cooler 3 during the torque converter 1 is in a lock-up state.

Namely, for improving the fuel economy by the locking-up of the torque converter, it is necessary to enlarge the lock-up region up to low load on low speed driving of a vehicle to the extent possible during operation thereof. Meanwhile, when the vehicle is running at a low speed, the engine speed becomes low. Moreover, the torque converter uses discharged from an engine-driven oil pump, as the hydraulic oil for various operations including the lock-up control operation. Thus, in case of such a low speed of the vehicle, reduction in amount of the oil discharged from the oil pump makes it difficult to accomplish the locking-up of the torque converter. Therefore, when initially setting the lock-up speed of the vehicle, it has been a common practice to set the lock-up speed to the very limit speed at which the locking-up of the torque converter can be accomplished.

Nevertheless, if the hydraulic fluid of the amount corresponding to the area of the orifice 5 is always supplied to the oil cooler 3 during the locking-up of the torque converter 1, as in the case of the conventional hydraulic fluid cooling device, the hydraulic fluid may be insufficiently supplied to the apply chamber $1_A$. This may result in occurrence of a situation where the torque converter cannot be completely locked-up at the initially set lock-up speed of the vehicle. Consequently, this may raise a problem that the lock-up speed of the vehicle cannot be sufficiently reduced.

SUMMARY OF THE INVENTION

It is therefore a primary object of the present invention to eliminate the abovementioned problems and provide a lock-up type automatic transmission system with an improved cooling device.

It is another object of the present invention to provide a lock-up type automatic transmission system with an improved cooling device arranged such that only when the apply chamber of a torque converter has an excessive pressure, the excessive fluid is supplied to the oil cooler and cooled thereby, making it possible to sufficiently lower the lock-up speed of the vehicle.

To this end, according to the present invention, there is provided a lock-up type automatic transmission system comprising: a torque converter arranged in a power transmission path of the system and comprising a lock-up clutch that partitions inside of said torque converter into an apply chamber and a release chamber, and which in its engaged state connects input and output elements of the transmission system with each other so that the torque converter assumes a lock-up state, and a lock-up control valve through which a torque converter operating pressure can be supplied to the apply chamber and the release chamber is communicated with a drain circuit to achieve the lock-up state of the torque converter; and a hydraulic fluid cooling device comprising an oil cooler, and a by-pass valve connected to the apply chamber and operative when a pressure in the apply chamber is not below a predetermined level, so that a part of the hydraulic fluid being directed toward the apply chamber is supplied to the oil cooler.

With such an arrangement according to the present invention, under the control of the lock-up control valve, when the torque converter operating pressure is supplied to the apply chamber and the release chamber is communicated with a drain circuit, the torque converter assumes the lock-up state in which the input and output elements are directly connected with each other.

In this instance, the by-pass valve responds to the pressure in the apply chamber and operates when the pressure reaches or exceeds a predetermined level such that a part-of hydraulic fluid being supplied to the apply chamber is directed to the oil cooler of the automatic transmission and cooled thereby. Thus, in the case of the torque converter assuming the lock-up state, only when the apply chamber is prevailed by an excessive pressure, i.e., only when an excessive fluid is generated, the excessive fluid is supplied to the oil cooler. Basically, in the case of the hydraulic fluid cooling device, the hydraulic fluid supplied to the apply chamber of the torque converter is never decreased below the minimum required amount to establish the lock-up state. Consequently, the present invention can eliminate the problem of the conventional apparatus in which, for instance, the hydraulic fluid cooling device may prevent achievement of a reduced lock-up speed of the vehicle.

Preferably, the lock-up control valve of the automatic transmission system according to the present invention, which is responsive to the pressure of the apply chamber may serve as the by-pass valve of the hydraulic fluid cooling device. In this instance, the oil cooler may be interposed in the drain circuit.

With such an arrangement, there is no necessity for newly adding a by-pass valve to the apparatus. Consequently, the automatic transmission system with an improved hydraulic fluid cooling device can be realized at a low price.

BRIEF DESCRIPTION OF THE DRAWINGS

The present invention will be described in further detail hereinafter, with reference to a specific embodiment shown in the accompanying drawings.

DESCRIPTION OF THE PREFERRED EMBODIMENT

Figure 1:
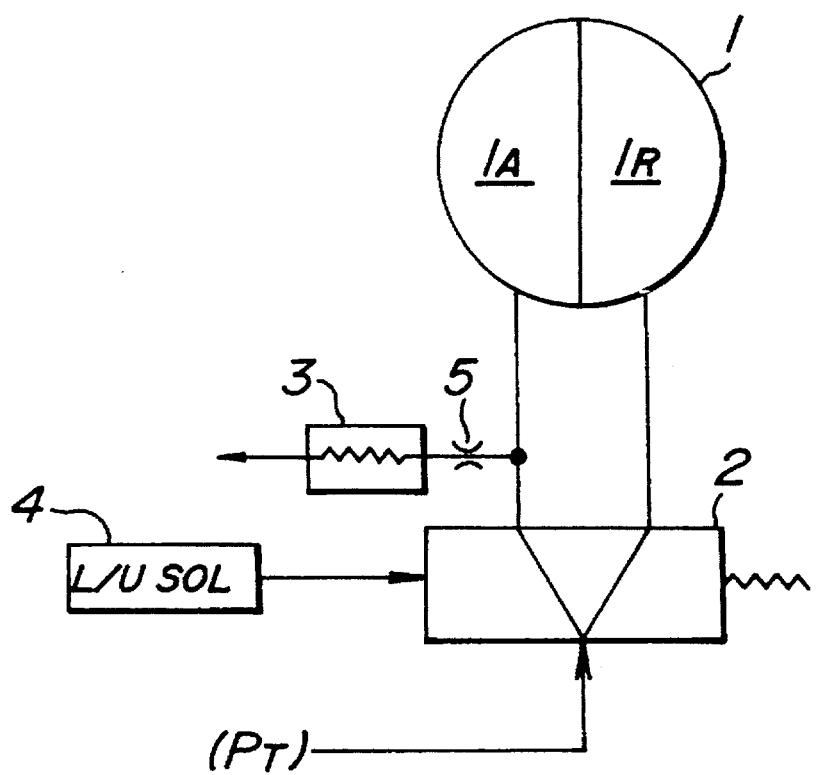
FIG. 1 is a primary hydraulic circuit diagram illustrating a conventional hydraulic fluid cooling device which has been discussed above.
Figure 2:
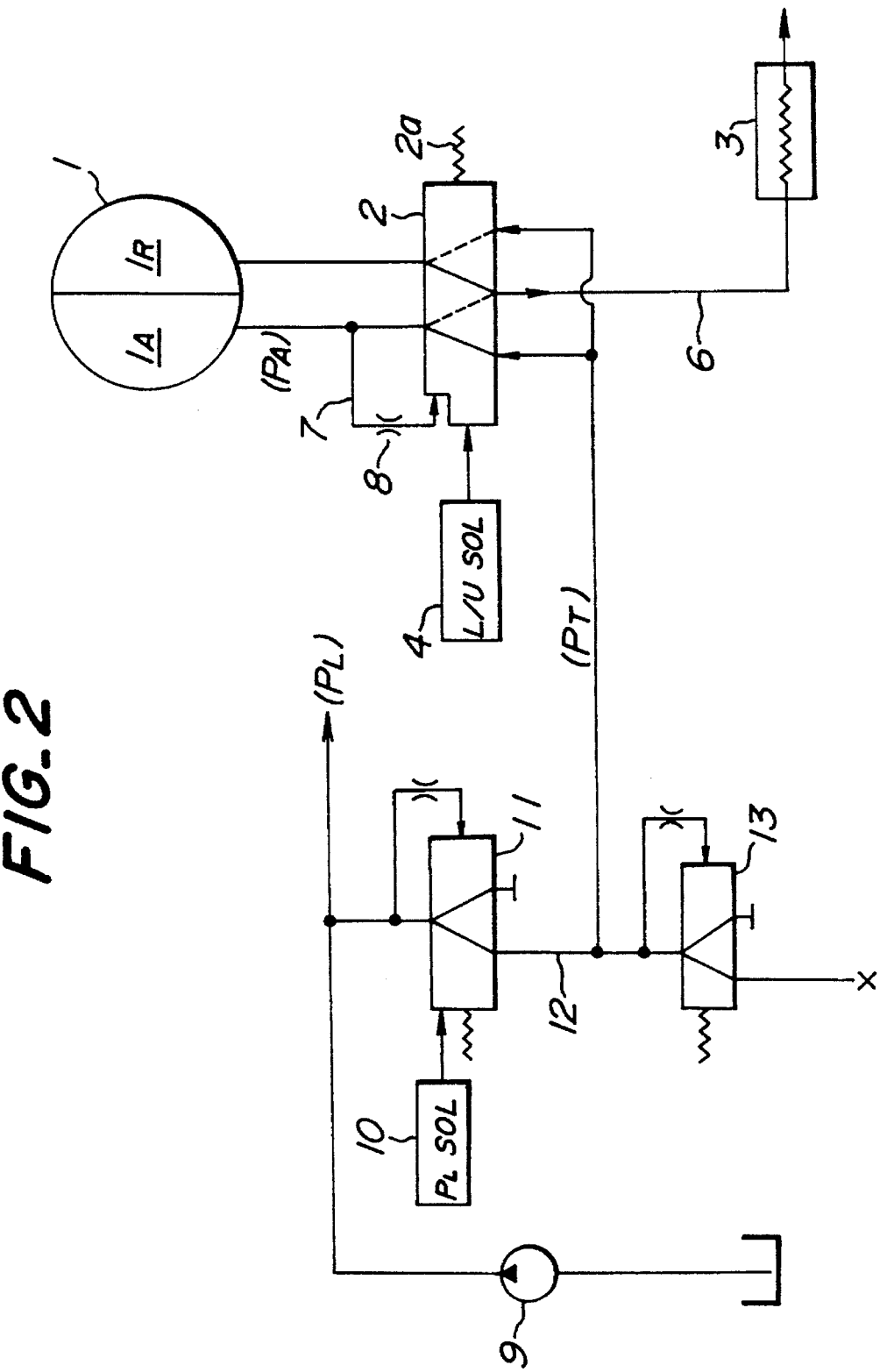
FIG. 2 is a hydraulic circuit diagram illustrating a hydraulic fluid cooling device for an automatic transmission according to a preferred embodiment of the present invention.

FIG. 2 illustrates a preferred embodiment of the hydraulic fluid cooling apparatus for use in an automatic transmission system. For the sake of convenience, elements explained with reference to FIG. 1 are denoted by like reference numerals. The automatic transmission system may be basically same as that disclosed in the abovementioned "Service Manual For Nissan RE4R01A-Type Full-Range Electronically Controlled Automatic Transmission", so that the relevant disclosure of this manual is herein incorporated by reference.

Reference numeral 1 schematically denotes a torque converter having an apply chamber $1_A$ and a release chamber $1_R$ into which the torque converter is partitioned by a lock-up clutch (not shown). When the lock-up control valve 2 assumes a position in which the torque converter operating pressure $P_T$ is supplied to the apply chamber $1_A$ and the release chamber 1R is connected to a drain circuit 6, the lock-up clutch is engaged to establish a lock-up state of the torque converter 1. Conversely, when the torque converter operating pressure $P_T$ is applied to the release chamber $1_R$ and the apply chamber $1_A$ is connected to the drain circuit 6, the lock-up clutch is disengaged to establish a converter state of the torque converter.

The lock-up control valve 2 is normally biased by a spring 2a into a port connection position indicated by broken lines, in which the torque converter operating pressure $P_T$ is supplied to the release chamber $1_R$ and the apply chamber $1_A$ is connected to the drain circuit 6. When the lock-up control valve 2 is applied with a signal pressure from the lock-up solenoid 4 in the direction of the arrow, the lock-up control valve 2 is put into another port connection position indicated by solid lines, in which the torque converter operating pressure $P_T$ is supplied to the apply chamber $1_A$ thereby generating an apply pressure $P_A$, and the release chamber $1_R$ is connected to the drain circuit 6.

In the illustrated embodiment, there is provided a feedback circuit 7 that is operative so that the lock-up control valve 2 responds to the apply pressure $P_A$ in the converter apply chamber $1_A$. The apply pressure $P_A$ is applied from the feedback circuit 7 to the lock-up control valve 2 in the same direction as the signal pressure applied from the lock-up solenoid 4 thereto. Furthermore, an orifice 8 is inserted into the feedback circuit 7 for preventing occurrence of pulsation. Even when the apply pressure $P_A$ is fed back from the circuit 7 to the lock-up control valve 2, in addition to the application of the signal pressure from the lock-up solenoid 4 thereto in the direction of the arrow, if the apply pressure $P_A$ is lower than a predetermined level, the lock-up control valve 2 maintains the port connection state as indicated by the solid lines. However, if the apply pressure $P_A$ reaches or exceeds the predetermined level, while maintaining the port connection state as indicated by the solid lines, the lock-up control valve 2 performs a further stroke motion against the spring 2a and causes an excessive part of the hydraulic fluid that is directed toward the apply chamber $1_A$ to escape to the drain circuit 6. Thus, in this embodiment, the lock-up control valve 2 serves as the by-pass valve.

In the illustrated embodiment, the cooling of the hydraulic fluid for the automatic transmission system is accomplished by cooling the abovementioned excessive part of the hydraulic fluid, so that the oil cooler 3 is inserted in the drain circuit 6. The hydraulic fluid passed through the oil cooler 3 may be supplied to the lubricating portion of a gear shifting mechanism, in a conventional manner.

A circuit for generating the torque converter operating pressure $P_T$ will be described below. This circuit uses a pump 9 as a pressure source. The pressure exerted by a hydraulic fluid supplied from the pump 9 is adjusted to a predetermined line pressure $P_L$ by a regulator valve 11 adapted to respond to a signal pressure supplied from a line pressure solenoid 10. The upper limit value of the torque converter operating pressure $P_T$ is determined by a torque converter relief valve 13 by using the excessive part of the hydraulic fluid, which is supplied from the regulator valve 11 to the circuit 12 as a pressure medium.

The operation of the embodiment explained above will be described below.

When there is no signal pressure from the lock-up solenoid 4, the lock-up control valve 2 is biased by the spring 2a into the port connection state as indicated by the broken lines. Thus the torque converter operating pressure $P_T$ is supplied to the release chamber $1_R$, and the apply chamber $1_A$ is connected to the drain circuit 6. Consequently, the torque converter 1 performs the power transmission in the converter state.

When a signal pressure is applied from the lock-up solenoid 4 to the lock-up control valve 2 in the direction of the arrow, the lock-up control valve 2 is changed-over into the port connection state as indicated by the solid lines. Thus, the lock-up control valve 2 supplies the torque converter operating pressure $P_T$ to the apply chamber $1_A$ and generates the apply pressure $P_A$ therein. Moreover, the lock-up control valve 2 connects the release chamber $1_R$ with the drain circuit 6. Consequently, the torque converter 1 performs the power transmission in the lock-up state.

When the apply pressure $P_A$ is below the predetermined level, the lock-up control valve 2 does not allow any part of the hydraulic fluid directed toward the apply chamber $1_A$ to escape to the drain circuit 6 even if the apply pressure $P_A$ is fed back from the circuit 7 to the lock-up control valve 2 in the direction in which the lock-up control valve collaborates with the lock-up solenoid 4. Meanwhile, if the apply pressure $P_A$ reaches or exceeds the predetermined level, the lock-up control valve 2 performs a stroke motion against the spring 2a and causes an excessive part of the hydraulic fluid directed toward the apply chamber $1_A$ to escape to the drain circuit 6 while maintaining the port connection state (i.e., the lock-up state of the torque converter 1) indicated by the solid lines. Thus the hydraulic fluid of the automatic transmission system can be cooled by passing the excessive part of the fluid through the oil cooler 3.

Therefore, when there is an excessive part of the hydraulic fluid fed to the apply chamber $1_A$ that controls the lock-up of the torque converter, the cooling of the hydraulic fluid is performed by feeding the excessive part of the fluid to the oil cooler 3. Such cooling does not make it difficult to achieve the lock-up state due to a reduced amount of the hydraulic fluid. Thus, even when the lock-up of the torque converter 1 is performed in the low speed range where the absolute quantity of the hydraulic fluid becomes small, it is possible to positively and reliably achieve the lock-up state. This serves to readily realize a low lock-up speed of the vehicle.

While the present invention has been described with reference to a specific embodiment, it is of course that various modifications and/or alterations are possible without departing from the scope of the invention as defined by the appended claims.

I claim:

1. A lock-up type automatic transmission system comprising:
    a torque converter arranged in a power transmission path of the system and comprising;
        a lock-up clutch that partitions inside of the torque converter into an apply chamber and a release chamber, wherein input and output elements of the transmission system are engaged with each other when said torque converter assumes a lock-up state, and
        a lock-up control valve through which a torque converter operating pressure is supplied using hydraulic fluid to said apply chamber and through which said release chamber communicates with a drain circuit to achieve said lock-up state of the torque converter; and
    a hydraulic fluid cooling device comprising;
        an oil cooler, and
        a by-pass valve connected to said apply chamber, said by-pass valve directing a part of the hydraulic fluid, which is directed toward said apply chamber, to said oil cooler only when the pressure in said apply chamber is at or above a predetermined level in said lock-up state.

2. The automotive transmission system according to claim 1, wherein said lock-up control valve is responsive to the pressure of said apply chamber and operates as said by-pass valve of the hydraulic fluid cooling device in said lock-up state.

3. The automatic transmission system according to claim 2, wherein said oil cooler is interposed in said drain circuit.

4. The automatic transmission system according to claim 1, wherein said oil cooler is interposed in said drain circuit.

5. The automotive transmission system according to claim 1, wherein said lock-up control valve directs the operating pressure to said release chamber and communicates said apply chamber to said drain circuit when the torque converter is in a converter state.

6. The automotive transmission system according to claim 5, wherein said lock-up control valve is responsive to the pressure of said apply chamber and operates as said by-pass valve of the hydraulic fluid cooling device in said lock-up state.

* * * * *